Figure 1:
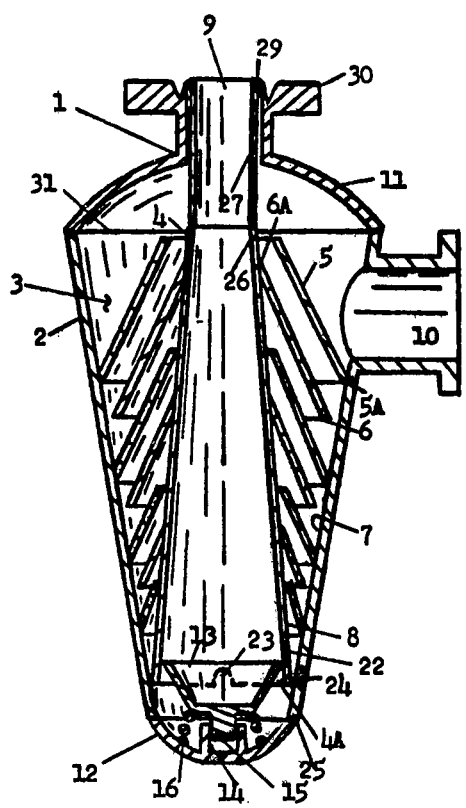

United States Patent [19]

Pauliukonis

[11] 4,418,717

[45] Dec. 6, 1983

[54] MODULAR PRESSURE LETDOWN VALVE

[76] Inventor: Richard S. Pauliukonis, 6660 Greenbriar Dr., Cleveland, Ohio 44130

[21] Appl. No.: 213,932

[22] Filed: Dec. 8, 1980

Related U.S. Application Data

[63] Continuation-in-part of Ser. No. 55,470, Jul. 6, 1979, Pat. No. 4,270,571.

[51] Int. Cl.³ .............................................. F16K 47/04
[52] U.S. Cl. .............................. 137/614.2; 137/614.19; 251/127; 138/42; 366/338
[58] Field of Search ....................... 137/614.11, 614.19, 137/614.2; 251/127; 366/336, 337, 338; 138/43, 44, 45, 42

[56] References Cited

U.S. PATENT DOCUMENTS

| 352,273 | 11/1886 | Solano | 251/127 |
| 359,389 | 3/1887 | Hill | 251/127 |
| 1,013,483 | 1/1912 | Gaa | 251/127 |
| 1,645,601 | 10/1927 | Lee | 251/127 |
| 3,253,401 | 5/1966 | Wells | 138/42 |
| 4,007,908 | 2/1977 | Smagghe et al. | 251/127 |

FOREIGN PATENT DOCUMENTS

| 410891 | 11/1979 | Austria | 138/42 |
| 233641 | 2/1910 | Fed. Rep. of Germany | 251/127 |

Primary Examiner—A. Michael Chambers
Attorney, Agent, or Firm—R. S. Pauliukonis

[57] ABSTRACT

A pressure letdown valve includes a housing with a bore passing therethrough which may be tapered and adaptable of receiving internally a coaxial central tube with tapered outside diameter and also two concentric sets of circular baffles frictionally secured in place within the tapers in an interjacent relationship therebetween and so arranged as to provide an alternating valve and baffle structure with multitude of flow reversals fluid passing through the valve must complete with accomplished throttling of high pressure fluid entering valve bore via a fluid supply port located in the center to proceed by way of central tube into the region of peripherally spaced alternately attached baffles respectively sealing on said bore and said central tube for a large pressure reduction through a process of energy conversion when flowing over the plurality of such baffles to exit at substantially lower pressure via a fluid exhaust port including internal valving means and means for a modular baffle assembly and dis-assembly facilitating cost effective fabrication and maintenance of this valve.

10 Claims, 2 Drawing Figures

U.S. Patent

Dec. 6, 1983

4,418,717

MODULAR PRESSURE LETDOWN VALVE

This application for patent is a continuation-in-part of the application entitled HIGH PRESSURE LETDOWN VALVE, filed July 6, 1979 Under Ser. No. 055,470, presently allowed to issue as U.S. Pat. No. 4,270,571.

The present invention provides for valves handling large fluid volumes in general and permits an economical manufacture of pressure letdown valves capable of large pressure drops required by energy related coal conversion process in particular. Specifically, this invention is intended to fill the gap of valves industry is seeking for use with systems handling slurry, in particular in coal liquefacttion process which contains solids, liquids and gases in a stream of extreme erosion and corrosion subject to new materials of construction, design and fabrication within a reasonable cost.

It is obviously desirable to provide valves of this general type which can be produced from highly sophisticated materials to solve the problem of wear, at least by extending the service life of such valves.

The present invention provides valves of this general type which are designed to permit a dynamic maintenance program with capability of an easy replacement of parts. One aspect of the invention permits a modular valve construction with easy access for inspection and associated corrective measures including removal and replacement of worn out valve components when needed.

These and other objects and advantages of the invention will become more fully apparent from the following description of the embodiment of the invention taken together with the accompanying drawings.

IN THE DRAWINGS

FIG. 1 is a cross-section of pressure letdown valve of the present invention illustrating basic valve components necessary for pressure reduction.

Figure 2:
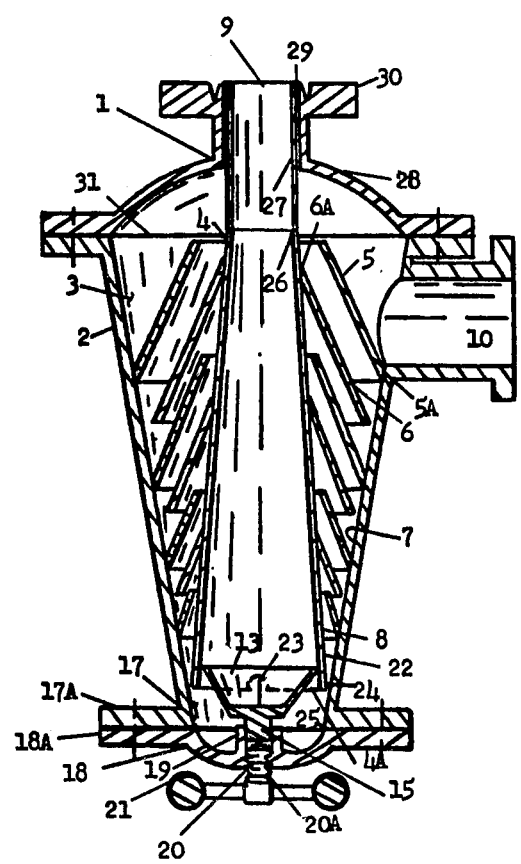

FIG. 2 identifies the same valve shown in FIG. 1 with housing modifications needed for valve assembly and maintenance, including external adjustment of a valving means.

Shown in FIG. 1 and FIG. 2 is a valve 1 with housing 2 provided with a bore 3 which is tapered and adaptable of receiving internally a coaxial central tube 4 with tapered outside diameter and also two sets of circular baffles of conical or dished configuration frictionally secured in place within the tapers in an interjacent relationship therebetween and attached alternately thereto so as to have a first set 5 of bafles 5A sealing on the bore taper 7 while a second set 6 of baffles 6A is sealing on the tube taper 8 to provide an alternating valve and baffle flow structure with multitute of flow reversals fluid entering a fluid supply port 9 and flowing via a plurality of baffles shown must perform before exiting through a fluid exhaust port 10 after completing a process of energy conversion with associated pressure reduction due to torturous pathway baffles provide, including a large and a small covers at each housing end. It should be noted that the tapers of both the inside bore taper 7 and the outside tube taper 8 may be provided with a taper angle selected from those known as "SELF-HOLDING" tapers, primarily used in the machine tool industry for holding different cutting tools inside arbors because the tools with self-holding tapers stay in place owing to the small taper angles without any additional means of holding the shank in a socket during the operation of such tools in a specific machine. Locking baffles frictionally with identical taper angle respectively on inside and outside edge of a baffle, depending on the baffle set and the location such baffle is to assume individually when attached to said tapers offers means for novel valve assembly in modules with proper sealing on either housing bore or on central tube because of retention force self-holding tapers inherently provide, thereby simlifying not only initial valve assembly but also subsequent valve dis-assembly for maintenance, normally subject to limited access due to the fabrication including welding parts together, prohibiting baffle removal without physical destruction of such components, thereby precluding means for an easy replacement of worn out parts and economical servicing of such valves. Obviously baffles could be assembled without welding by other means (not shown) known to be suitable for modular construction. Specifically, nesting rings could be employed between baffles for baffle retention in place by edges in cases where taper is not of the self-holding angle, or where flow requirements call for large chambers which indeed may dictate making both the central tube and the housing bore straight, without departing from the scope and the spirit of this invention.

Further, it should be stated here that the components described above basically are sufficient to perform the fundamental function of fluid throttling with associated dramatic pressure reduction induced thereto during fluid passing the plurality of closely spaced baffles inside bore 3 when allowed to enter by way of fluid supply port 9 and proceed via central tube downward to exit by way of exhaust port 10 after completing many turns when crossing interjacent baffles upwards with pressure drop per turn exceeding 4 velocity heads. Any other valving means or flow controls or the like if added to the basic valve components above must be considered as an adjunct of convenience rather than necessity for fluid throttling by letdown valves of this type, since generally systems employing such letdown valves are also provided with separate valves for starting and stopping the flow. However, provisions for flow control can easily be incorporated into the present design. A dished or conical circular disk may be provided as a flow control element of the valve accomplishing both, additional throttling and shutoff, and secured inside the end of the conical central tube as shown in the drawings FIG. 1 and FIG. 2, adjacent skirt 22 with slots 23. In FIG. 1 such valving means include a spring compensated disk 13 wedged against the tapered tube exit mouth 4A above slots 23 of skirt 22 at small bore end covered by the small cover 12 provided with a hub 14 for guiding disk 13 by way of a disk extension 15 surrounded by a compression spring 16 not only centrally but also axially so as to maintain valve in a first normally closed position until fluid entering supply port 9 exerts force larger than the opposite biasing force spring provides to move valve into a second valve open position allowing fluid communication between the fluid supply port 9 and the fluid exhaust port 10 for as long as the flow continues. Discontinuing the flow into the port 9 or dropping the fluid pressure to result in a fluid force lower than that of the opposing spring force will render valve automatically closed by the prevailing spring biasing force, and vice versa, thereby facilitating means for an automatic valve operation with valving means of FIG. 1.

In FIG. 2 the same disk 13 operating in the same fashion as the valving means of FIG. 1 identifies an alternate means for fluid flow control through the valve, thereby providing features not attainable by other valve designs of this or similar type that may be in existance. In FIG. 2 we also find that the small bore end 17 of housing 2 is flanged as shown by 17-A, and therefore the small bore end cover 18 is also provided with equivalent matching flange 18-A, including a similar internal hub 19 which is partially threaded as shown by 20 to receive a threaded stud 20A of an external valve adjusting wheel 21. Instead of operating automatically with spring enerzed of FIG. 1, the valving means of FIG. 2 are actuated manually by way of threads when wheel 21 is turned advancing stud 20A inside threads 20 against disk extension 15 of disk 13. Shown in FIG. 2, disk 13 is wedged against mouth 4A above the slots 23 of the tube skirt 22 adjacent small bore end covered by the small flanged cover 18 to maintain valve in a first closed position by the stud 20A instead of spring 16 of FIG. 1 until fluid under pressure is provided to enter fluid supply port 9 excerting fluid pressure force over disk 13 of large magnitude at which time wheel 21 may be turned so as to permit back off of the disk 13 facilitating fluid communication between the fluid supply ports 9 and 10 respectively. Wheel 21 may be turned back and forth to either close passage of the fluid along periphery of disk 13 or open the same as needed, and vice versa, facilitating simple and effective valving means for this valve.

It should be pointed out that the fluid gap between disk 13 periphery and tapered skirt at mouth 4A will vary depending on the taper angle. However, because of the additional throttling effect small gap may yield, it may indeed be beneficial to build central tube 4 with steep taper angle not only externally where baffles are attached frictionally but also internally where the valving means are incorporated for best results. Incidentally, to insure that another fluid gap 24 between small housing taper end 25 at the small bore end and the skirt 22 outside diameter does not become incidentally closed due to dimensional variation of parts, thermal expansion in service or the like, rendering difficulties for fluid passage therethrough, skirt 22 may be either slotted as shown by slots 23 or it may be skewed (not shown). Another small taper 26 of central tube 4 adjacent larger covers at the top bore end which is tapered in the opposite direction as drawings FIG. 1 and FIG. 2 show can be permanently secured to an internally protruding tubular stub 27 by welding or otherwise sealed before final valve assembly. In fact, final assembly of baffles inside housing bore has to be made before large cover 11 of FIG. 1 and a large cover 28 of FIG. 2 are permanently secured in place by resorting to the following sequence of steps comprising specification in manufacture and maintenance of these valves. First, central tube 4 with stub 27 attached has to be lowered into the housing bore until it is seated over the valving means and specifically, over the disk 13 and then baffles are to be lowered and frictionally or otherwise secured one by one alternately to the bore 7 and taper 8 of the housing bore and central tube 4 respectively in an interjacent relationship until the last baffle of largest diameter is loaded into the valve proper. Only then covers 11 and 28 can be placed over the large open mouth 31 of housing bore 3 by snaking carefully tubular stub 27 through a central and coaxial opening covers 11 and 28 respectively provide to perform last task of the assembly by edge welding stub 27 to a lip 29 of the flange 30 of the inlet port 9. Dis-assembly is likewise very simple. Only lip 29 needs to be cut open to remove larger covers from housing mouth 31 in order to conveniently enter bore 3 and replace worn out parts. Cover 11 can not be so easily removed because FIG. 1 illustrates welded assembly requiring additional cutting of the housing in order to get into the inside of the valve for servicing. Obviously design of FIG. 2 is preferred, in particular in large and expensive valves which can be solvaged and repaired less costly if access to the valve inside is provided not only by flanged large covers but also by flanged small covers as well, in particular if inside valve components are produced from highly sophisticated materials that can be abused by highly corrosive and abrasive fluids such as the case is when handling coal slurry in coal conversion process or similar processes requiring valves that are simple to manufacture and maintain.

It should be pointed out that frictional loading of baffles inside valves shown in FIG. 1 and FIG. 2 permits an easy unloading by tapping contact areas with a force nearly equivalent to the force that was needed to initially seat them within the self-holding tapers. Experiments show along with experience gained in machine tool industry that little force is needed for permanently seating baffles in place frictionally. Likewise, little force would be needed to unseat baffles during maintenance for replacement of worn out parts, except perhaps for abuse to the surface extreme utilization and neglect to service valve in rationally spaced periods under a dynamic maintenance program for modular valve assembly and dis-assembly may materialize. However, even under most severe service condition baffles may be forced out of their seats in particular if access is provided from both ends to the housing bore 3, as provided by valve design depicted in FIG. 2 thereby satisfying the objectives set forth for this invention. Finally, the fact that baffles provide extended surface for improvements in heat transfer coefficient is another unparalleled advantage of this design. It will be understood that the invention has a scope unlimited by the specific details of the illustrated embodiment thereof and that it is susceptible to modifications without departing from the scope of the invention defined by the following claims.

What is claimed is:
1. A modular pressure letdown valve comprising:
   a valve housing with a bore passing therethrough having fluid supply and exhaust port means incorporated therein including two concentric sets comprising a plurality of circular dished baffles spaced detacheably inside said bore in an interjacent relationship so as to accomplish throttling of high pressure fluid entering said bore via said fluid supply port means to exit at substantially lower pressure via said fluid exhaust port means after flowing over said plurality of said baffles arranged so as to provide an alternating valve and baffle flow structure with a multitude of flow reversals,
   a coaxial central tube delivering said fluid from said fluid supply port meas adjacent a first bore end of said housing for discharge therefrom into said baffles adjacent a second bore end of said housing,
   said circular baffles alternatingly secured to said housing bore and said central tube both tapered in opposite directions so as to have a first set sealing on said bore while a second set is sealing on an outside diameter of said central tube.

2. A valve as in claim 1 wherein said coaxial central tube entering said bore continues therein on an increased taper angle by diameter difference from said first to said second bore ends terminating with a valving means substantially central thereto adjacent said second bore end for control of fluid flow through said valve between said fluid supply and exhaust port means, and when said valving means is in a first valve closed position, pressurized fluid entering said central tube is trapped therein until said valving means is moved to a second valve open position allowing fluid communication between said fluid supply and exhaust port means with induced pressure drop when fluid is forced to pass said interjacent baffles located substantially peripheral to said central tube inside said housing bore both tapers of said central tube and said housing bore providing means for edge mounting of different diameter baffles frictionally along the bore length.

3. A valve as in claim 1 wherein said central tube is provided with a skewed skirt adjacent said second bore end of said housing, including operating means incorporated therein substantially central thereto for control of fluid flow between said fluid supply and exhaust port means when said valve operating means is open allowing fluid passage over said interjacent baffles located substantially peripheral to said central tube inside said housing bore said tapers facilitating means for edge mounting of different diameter baffles inside thereof along the bore length frictionally at a selected distance therebetween.

4. A valve as in claim 1 wherein said central tube is provided with a set of fluid passage slots at a larger taper end adjacent said second bore end of said housing while a smaller tape end thereof adjacent said first bore end is connected to a short tubular stub of said fluid supply port, including means for valving incorporated therein for control of fluids flow between said fluid supply and exhaust port means wherein when said valving means is open allowing fluid passage over said baffle sets located substantially peripheral to said central tube inside said housing bore which is also tapered in the opposite direction to the taper of said central tube said tube and bore tapers facilitating means for edge mounting frictionally a plurality of different diameter circular baffles along the bore length within the taper angle provided therein, with said first set of said baffles attached to the incline of the inside surface of said tapered housing bore sealingly while said second set of said baffles is attached to the incline of the outside surface of said tapered central tube sealingly.

5. A valve as in claim 1 wherein said circular baffles are conical and attached to said housing bore and said central tube each tapered in the opposite direction frictionally by the baffle edges which are also tapered on an angle of the mating tapers of said bore and said tube respectively.

6. A valve as in claim 3 wherein said operating means includes a biasing force means for maintaining valve normally closed, said biasing force means acting in a direction opposite the direction of fluid flow through the valve.

7. A valve as in claim 4 wherein said tapered bore of said housing includes at said first bore end a large diameter open mouth adaptable to be closed by a large cover provided centrally with said fluid supply port means for accomodating said tubular stub conveniently therein for fluid communication to said central tube provided with said means for valving at said second bore end, including said fluid exhaust port means entering said bore perpendicularly via a side wall adjacent said open mouth thereof.

8. A valve as in claim 7 wherein said circular baffles each having an inside and an outside diameter corresponding to the diameters of said tapers of said bore inside and said central tube outside in the location said baffles must be secured by friction thereto during the initial valve assembly prior to closing said open mouth by said large cover thereby insuring access to the valve proper.

9. A valve as in claim 7 wherein said tapered bore of said housing includes at said second bore end a small diameter open end which is closed by a small cover provided with a biasing force means for said valving means to maintain valve in a first closed position and a second open position depending on the operating requirements.

10. A valve as in claim 9 wherein said small cover includes a coaxial centrally located external means for adjusting said valving means to render valve closed and valve open when desired, said external means for adjusting including an interconnecting screw to back-off said valving means from a corresponding seat inside said central tube adjacent said second bore end when valve is in said second open position and also to return said valving means into said corresponding seat when valve is in said first closed position.

* * * * *